United States Patent
Litovtchenko

(10) Patent No.: US 10,580,233 B2
(45) Date of Patent: Mar. 3, 2020

(54) METHOD AND APPARATUS FOR PROCESSING ALARM SIGNALS

(71) Applicant: Infineon Technologies AG, Neubiberg (DE)

(72) Inventor: Vladimir Litovtchenko, Ebersberg (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/222,250

(22) Filed: Dec. 17, 2018

(65) Prior Publication Data
US 2019/0188929 A1 Jun. 20, 2019

(30) Foreign Application Priority Data
Dec. 18, 2017 (DE) .................. 10 2017 011 685

(51) Int. Cl.
G08B 19/00 (2006.01)
G07C 5/08 (2006.01)
B60W 50/02 (2012.01)

(52) U.S. Cl.
CPC ....... *G07C 5/0816* (2013.01); *B60W 50/0205* (2013.01); *B60W 50/0225* (2013.01); *G07C 5/0808* (2013.01)

(58) Field of Classification Search
None
See application file for complete search history.

(56) References Cited

U.S. PATENT DOCUMENTS

2008/0140817 A1* 6/2008 Agarwal ............ H04L 41/0677
709/223
2008/0284582 A1* 11/2008 Wang .................. A61B 5/0205
340/521

FOREIGN PATENT DOCUMENTS

FR 2924239 A1 5/2009

* cited by examiner

*Primary Examiner* — John F Mortell
(74) *Attorney, Agent, or Firm* — Eschweiler & Potashnik, LLC

(57) ABSTRACT

A method for processing alarm signals is disclosed in which a multiplicity of selected alarm signals are first compared with a predefined alarm pattern. The multiplicity of the selected alarm signals are determined from the alarm signals. At least one response signal is then transmitted if the selected alarm signals match the predefined alarm pattern.

19 Claims, 3 Drawing Sheets

METHOD AND APPARATUS FOR PROCESSING ALARM SIGNALS

REFERENCE TO RELATED APPLICATIONS

This application claims priority to DE 10 2017 011 685.7 filed on Dec. 18, 2017, the contents of which are incorporated by reference in their entirety.

FIELD

The present disclosure relates to a method and an apparatus for processing alarm signals such as those which occur, for example, in the event of faults in automotive applications. Requirements for an efficient and functionally safe signal processing must be taken into account, particularly if the alarm signals are processed by microcontrollers.

BACKGROUND

In modern automobiles, more and more functions are implemented by electrical circuits and by software. Particularly in applications which cannot fall back on any mechanical design, e.g. in the case of an all-electric steering or an all-electric brake, the safe operation of the corresponding systems is an essential characteristic. As soon as malfunctions are detected in the corresponding hardware or software, an immediate response is required in order to ensure safe operation or restore safe operation within the respectively defined minimum time period.

Functional safety in the field of automotive applications is defined by the ISO 26262 standard. Microcontrollers which meet the specifications for functional safety are equipped with corresponding safety mechanisms (SM) in order to detect a malfunction of the system controlled by them or a malfunction of the microcontroller and respond appropriately.

The safety mechanisms contained in a microcontroller or microprocessor forward detected faults to a central fault processing module within the microcontroller which then triggers appropriate responses in order to clear the indicated faults or restore a safe status of the system controlled by the microcontroller.

Alarm signals which trigger specific responses of the microcontroller are therefore evaluated within the microcontroller. These responses can comprise, for example, the triggering of an interrupt, the resetting of an application or the resetting of the microcontroller or parts of the microcontroller, e.g. its CPU.

A particular difficulty is posed by the occurrence of a succession of alarm signals which in some instances are uncritical as individual alarms, but which indicate a major fault when occurring together.

SUMMARY

The present disclosure disclosure is directed to a method and an apparatus with which the occurrence of a plurality of alarms is evaluated and a corresponding response is triggered or prevented.

A first embodiment of the disclosure relates to a method for processing alarm signals which comprises comparing a multiplicity of selected alarm signals with a predefined alarm pattern, wherein the multiplicity of the selected alarm signals are determinable from alarm signals, and transmitting at least one response signal if the selected alarm signals match the predefined alarm pattern.

A second embodiment of the disclosure disclosure relates to an apparatus for processing alarm signals, and comprises an analysis unit which is configured to determine a multiplicity of selected alarm signals from a multiplicity of alarm signals and to compare the selected alarm signals with a predefined alarm pattern, and a response unit which is configured to generate at least one response signal if the selected alarm signals match the predefined alarm pattern.

A third embodiment relates to a microprocessor which is configured to carry out the method described here.

A fourth embodiment relates to a module containing a microprocessor which is configured to carry out the method described here.

DETAILED DESCRIPTION

The following detailed description refers to the attached drawings which form part of the disclosure and in which specific example embodiments are presented for illustration, by means of which, by way of example, the system and/or method disclosure can be implemented in practice. Other example embodiments can obviously be used and structural or other modifications can be made without departing from the protective scope of the present disclosure. The following detailed description is therefore not to be understood in a limiting manner. Instead, the protective scope of the present disclosure is defined only by the accompanying patent claims.

Figure 1:
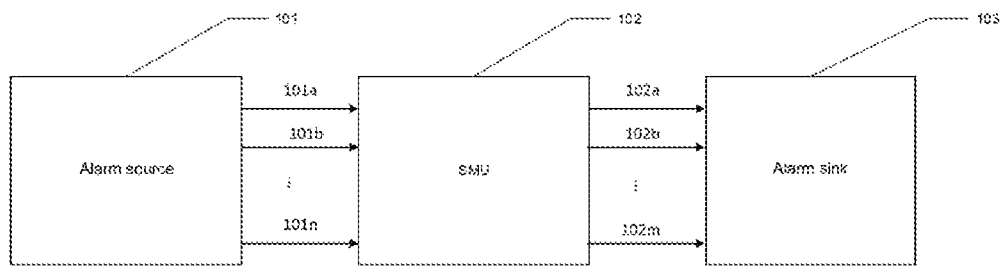
FIG. 1 shows a known system for processing alarm signals.

FIG. 1 shows a known system 100 with an alarm source or circuit 101 and an alarm sink or circuit 103. Both the alarm source 101 and the alarm sink 103 can form part of a microprocessor or a microcontroller. The alarm source 101 generates alarm signals 101a, 101b, . . . , 101n which indicate a fault condition or a plurality of fault conditions of the system 100. The alarm signals are therefore signals for fault detection (failure indication signals). They can be generated, for example, by a watchdog timer which has not been reset in a timely manner by software which is run on the CPU of the microprocessor.

In a known system (not shown), the alarm signals 101a, 101b, . . . , 101n are not generated by a single alarm source, but by a plurality of alarm sources.

The alarm signals 101a, 101b, . . . , 101n are fed to a safety management unit or circuit 102 (SMU). The safety management unit 102 analyzes and processes the received alarm signals and generates response signals 102a, 102b, . . . , 102m, wherein the number of response signals can be less than or equal to the number of received alarm signals, i.e. m≤n applies. The alarm response signals 102a, 102b, . . . , 102m are, for example, reset signals, interrupt signals or signals which are applied to an external pin of the microcontroller in order to enable an indication of the alarm or fault outside the microcontroller.

The response signals 102a, 102b, . . . 102m are fed to the alarm sink 103. The alarm sink 103 may, for example, be a central processing unit (CPU) of a microprocessor or an interrupt router (IR) which is similarly disposed within a microprocessor.

Figure 2A:
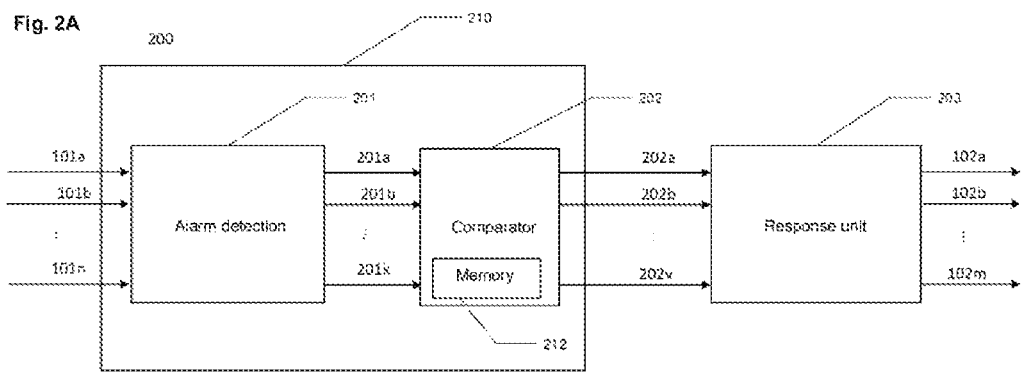
FIG. 2A shows a first embodiment for detecting and processing alarm signals.

FIG. 2A shows one embodiment of a safety management unit or circuit 200 which consists of an analysis unit or circuit 210 and a response unit or circuit 203. The analysis unit 210 comprises a detection unit or circuit 201 and a comparison unit or circuit 202.

The detection unit 201 detects present alarm signals 101a, 101b, . . . , 101n and is configured to receive as inputs a multiplicity of alarm signals, i.e. two or more alarm signals are input into the safety management unit (SMU). The alarm signals may originate, for example, from safety mechanisms (SM) disposed outside the SMU 200 which thus act as an alarm source and in each case trigger an alarm if a defective processing assigned to the respective SM is detected in the electronic circuit. The safety mechanisms can form part of the microcontroller.

In one embodiment (not shown), the safety mechanisms can also be disposed outside the microcontroller and can contain, for example, sensors which monitor safety-related parameters.

The alarm signals generated by the safety mechanism (SM) have an alarm type assigned to them. An alarm type is determined by its expected response. The alarm type can thus be e.g. "correctable" or "uncorrectable". A correctable alarm signal can trigger a response which shuts down the cause of the fault and results in a clearing of the alarm. Conversely, an alarm signal of the "uncorrectable" type can trigger a response in which the cause of the fault cannot be eliminated.

In a further example, alarm signals can have an alarm type by means of which the severity of the fault is indicated. Thus, for example, the "fatal" alarm type can indicate that a particularly severe fault has occurred. The assignment of a response to an alarm type is dynamic and can be defined, for example, by the requirements for the necessary safety level.

The alarms of an SM can always have the same alarm type. In a further example embodiment, an SM can also generate a plurality of alarms with different alarm types.

The alarm signals can be generated, for example, by a system control block which can be disposed outside the SMU and which generates alarm signals indicating e.g. a timeout of the watchdog timer (WDT), a power-on reset (POR) or an application reset. The alarm signals are, for example, digital signals which indicate the occurrence of an alarm assigned to them by means of a rising or falling edge. In one possible embodiment of the SMU, up to 1,000 alarm signals are input.

The detection unit 201 is configured to evaluate the detected alarm signals. Part of this evaluation is, for example, a prioritization of alarm signals or the selective suppression of specific detected alarm signals. Alarm signals of a specific type or from a specific alarm source, for example, could thus be suppressed in one embodiment. Suppressed alarm signals are not further processed and result in no alarm response and no transmission of a response signal.

The detection unit 201 is furthermore configured, in one embodiment, to exclude specific alarm signals or alarm types from a later comparison. For this reason, a filtering can be provided which selects specific alarms before a comparison with the alarm pattern takes place. In a further example embodiment, the filtering can be performed in such a way that only a specific, predefined succession of alarms or an alarm sequence is selected, i.e. passes through the detection unit.

The alarm detection unit 201 generates processed alarm signals 201a, 201b, . . . 201k, wherein the number of processed alarm signals k is less than or equal to the number of detected alarm signals n.

The processed alarm signals are fed to a comparison unit 202 which comprises a memory circuit 212. In one example embodiment, the processed alarm signals 201a, 201b, . . . , 201k are compared during a predefined time window with a predefined pattern of alarm signals stored in the memory 212 or with a predefined alarm pattern. If the processed alarm signals match one or more of the predefined alarm patterns, combined alarm signals 202a, 202b, . . . , 202v are generated.

The combined alarm signals 202a, 202b, . . . , 202v can also be formed from groups of selected alarm signals. If, for example, the selected alarm signals comprise the alarms A, D and E and the alarm pattern consists of the sequence "D-E", the combined alarm signal 202a can represent precisely this sequence. It should be noted that this group can comprise not only a plurality of alarm signals which are not defined by a temporal succession, but can also comprise a plurality of alarm signals which are defined by their temporal succession. The number of combined alarm signals 202a, 202b, . . . , 202v can be less than the number of selected alarm signals.

In a further embodiment, the time window can be randomly configured, i.e. the relevant time for the comparison of the observed alarms is definable with the alarm pattern. The size of the time window can be stored or programmed in a register or other memory for this purpose. The predefined time window may, for example, be 10 ms. It may, however, have any other duration. The time window is generally defined by the required safety level (functional safety level) or other system requirements. In one embodiment, the size of the time window can also be chosen so that it does not represent a restriction for the comparison. In a further embodiment, a restriction to a time window can also be completely deactivated.

The pattern of alarm signals can be defined by selecting a group of possible alarm signals. The temporal sequence during the predefined time window may be insignificant here. In a further embodiment, a specific temporal succession of alarm signals can define the alarm pattern.

If, for example, three alarm signals A, B and C are relevant, a first pattern M1={A, B, C} comprising only the group of A, B and C can be stored. An alarm sequence "A-C-B" would match the pattern M1. Equally, the alarm sequence "B-C-A would match the pattern M1.

In a further embodiment, an alarm pattern is defined not only by the group of alarm signals, but also by their order. If, for example, a second pattern defined by M2={B-C-A} is stored, only the exact alarm sequence "B-C-A", and not the alarm sequence "A-B-C", would match the pattern.

In a further embodiment, the alarms A, B and C, for example, are input successively in a configurable time segment, wherein the alarm A may be an alarm of a first type (e.g. a correctable WDT alarm) and both B and C may be alarms of a second type. An alarm pattern or a predefined combination of possible alarm signals could then define the occurrence of the alarms A, B and C in a random order. This means that both the sequence of alarm signals "A-B-C" and the sequence of alarm signals "B-A-C" or any other combinations of the three alarms match the predefined pattern.

In a further embodiment, the memory 212 contains a plurality of alarm patterns which contain either a group of specific alarm types or sequences of alarm types or a combination of a group and sequence of specific alarm signals or alarm types.

If a plurality of alarm signals matching one of the stored, predefined alarm patterns are detected in a predefined time window, a combined alarm signal 202a, 202b, ..., 202v is transmitted accordingly. Conversely, if no plurality of alarm signals or alarm types matching one of the patterns is detected in the predefined time window, no assigned combined alarm signal is transmitted.

The combined alarm signals 202a, 202b, ..., 202v are fed to an alarm response unit or circuit 203. The latter is implemented, for example, by a response matrix which assigns one or more response signals 102a, 102b, ... 102m to the combined alarm signals and transmits said response signals. These alarm response signals 102a, 102b, ... 102m may, for example, be one or more CPU reset signals which are connected to a CPU which is in turn part of a microcontroller.

In a further example, the response signals may also be interrupt signals which are connected to an interrupt router which in turn forms part of a microcontroller. In a further example, the response signal may be a random trigger signal or a signal which is fed onto an external pin of a microcontroller.

Figure 2B:
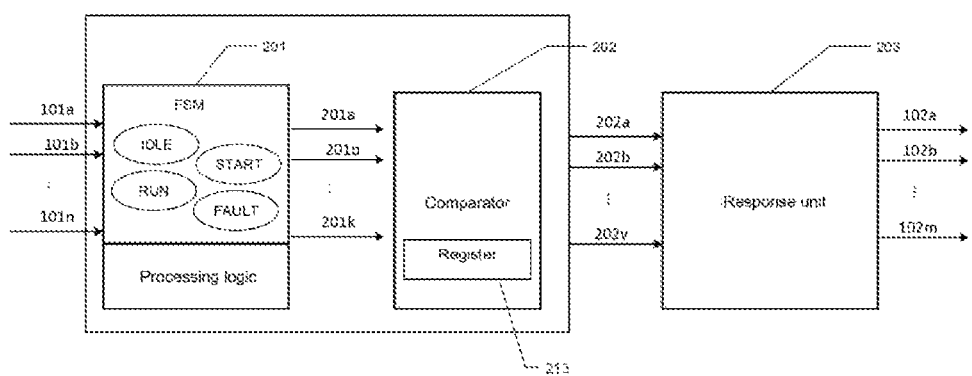
FIG. 2B shows a further embodiment for detecting and processing alarm signals.

FIG. 2B shows a further embodiment of a safety management unit. The detection unit or circuit 201 can be formed by a finite-state machine (FSM) and a processing unit (processing logic). The FSM may, for example, have the states IDLE, START, RUN and FAULT.

The memory 212 can be formed by registers 213. These registers can, for example, have a width of 32 bits. In one embodiment, a register is assigned to each alarm type. A specific bit in one of the registers can be assigned, for example, to the "correctable" alarm type. If an alarm of this type is then detected, for example by the watchdog timer (WDT), and is transmitted by the detection unit 201, for example as the signal 201a, the corresponding bit in the assigned register is set to 1.

The alarm response unit 203 is implemented in one embodiment by a look-up table (LUT). The alarm patterns and the response signals assigned to the alarm patterns are recorded in this LUT. An interrupt reset signal, for example, which is then transmitted as the response signal 102a can thus be assigned to the "fatal" alarm.

Figure 3:
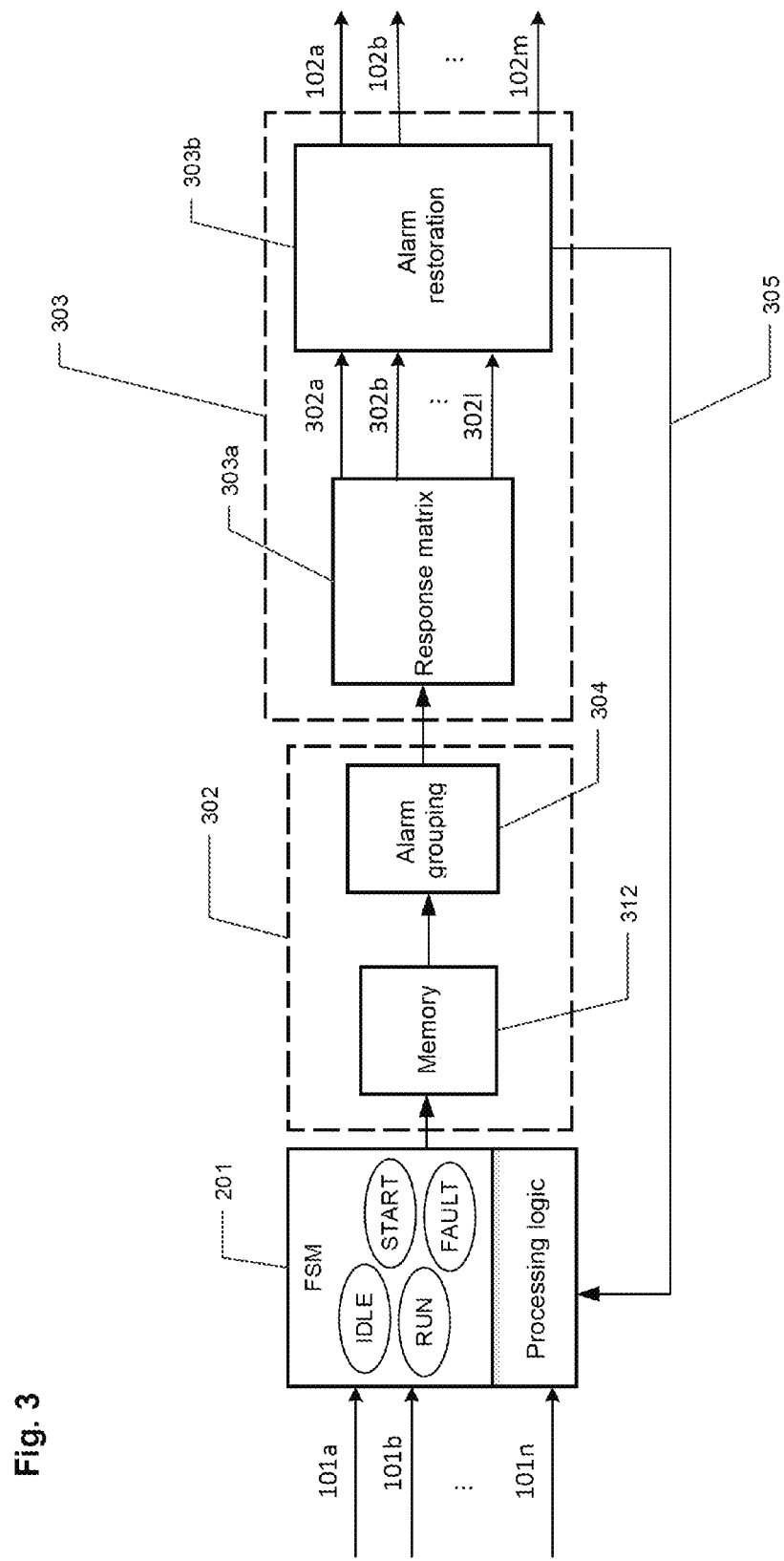
FIG. 3 shows an embodiment with a feedback path.

FIG. 3 shows a further embodiment of a safety management unit (SMU). In this example embodiment, the SMU has an alarm response unit 303 comprising a response matrix or circuit 303a and an alarm restoration unit or circuit 303b. The SMU furthermore contains a comparison unit or circuit 302 which comprises an alarm grouping unit or circuit 304.

In one embodiment the alarm grouping unit 304 is configured to output the marked or masked alarm signals according to the entries in the memory 312 and then to combine the output alarm signals into groups. The formed group of alarm signals can be compared with an alarm pattern within the alarm grouping unit. If, for example, a group which can also be determined by a succession or sequence of alarms matches the stored alarm pattern, alarm signals correspondingly reduced in number are transmitted by the alarm grouping unit 304 to the response matrix 303a.

Intermediate response signals 302a, 302b, ... 302l are assigned in the response matrix 303a to the alarm signals matching the alarm pattern. Said intermediate signals can control possible system responses which are to be performed. These include, for example, the triggering of an application reset or a non-maskable interrupt (NMI).

The alarm restoration unit 303b is configured to verify the relevance of the intermediate response signals 302a, 302b, ..., 302l generated by the response matrix 303a. This relevance can be defined in that a specific time has elapsed since the detection of the alarm signal by the detection unit 201 and therefore the corresponding alarm or the group of alarm signals or the alarm sequence is no longer relevant. The time period significant for this relevance can be predefined so that, for example, alarm signals which are older than 30 ms no longer trigger the transmission of a response signal 102a, 102b, ..., 102m. This corresponding information is forwarded via the feedback path 305 to the processing logic within the detection unit 201.

In one embodiment, the response signal is generated only if a specific alarm sequence still remains present after a specific test time. If it is evident, for example, following the comparison with the predefined alarm pattern, that the output alarm is no longer present after a specific test time, no response signal is generated.

In a further embodiment, the response signal is not generated if the module, i.e. the safety mechanism (e.g. a system control block), triggering the alarm cancels the alarm. In this case, the test time is determined by the first occurrence of an alarm or an alarm group and the cancellation of the corresponding alarm or the corresponding alarm group.

Figure 4:
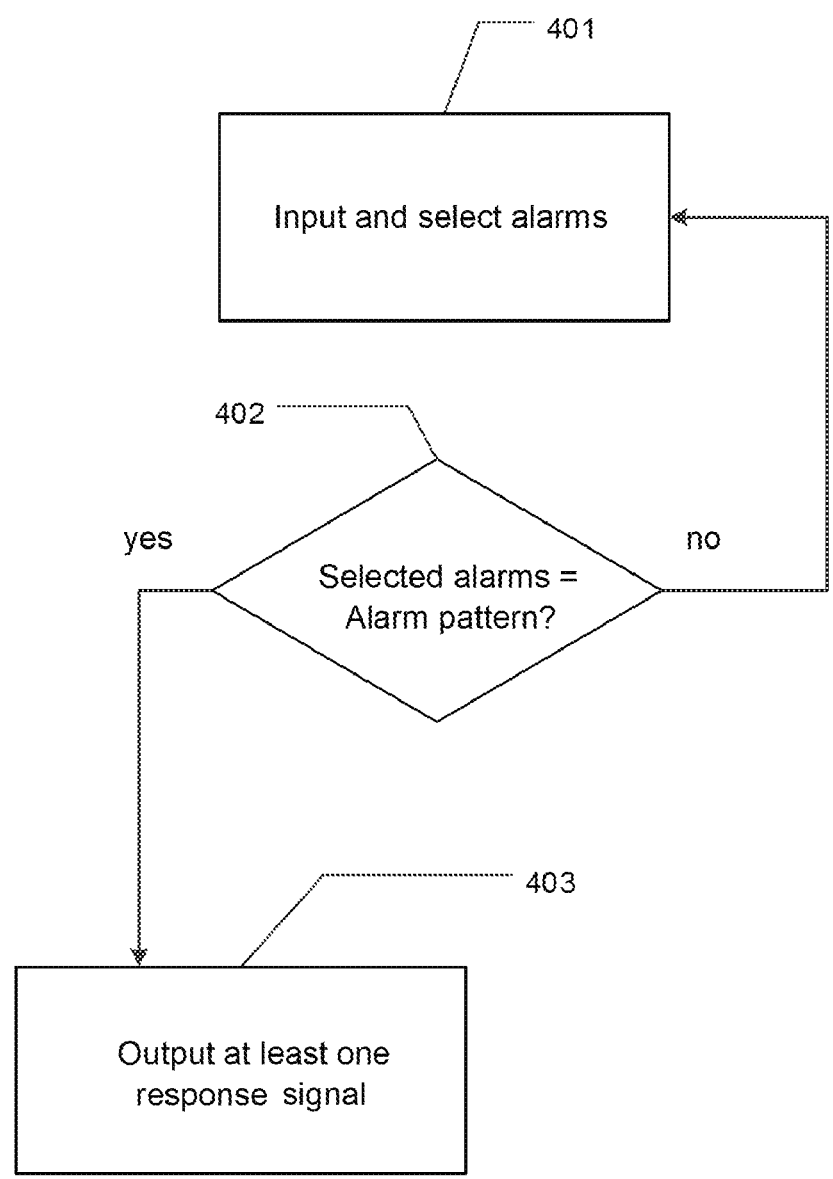
FIG. 4 shows a flow diagram.

FIG. 4 shows various acts of the described method for generating response signals, particularly in response to faults in an automotive system. These faults generate alarm signals which result in critical situations, particularly if they occur in specific circumstances.

Act 401 begins with the input of alarm signals. These alarm signals indicate a system malfunction and may be generated, for example, by sensors in the automobile or by components within a microcontroller. This also includes software errors which are detected e.g. by a lockstep mechanism.

At act 402, a comparison of input and selected alarm signals with a predefined alarm pattern takes place. The number of input alarm signals and the number of alarm signals used for the comparison may differ. This means that not all input alarm signals are necessarily used for a comparison. Instead, the possibility exists of a selection of input alarm signals from alarm signals which are not relevant to the comparison.

At act 403, one or more response signals are then transmitted if the input and selected alarm signals match the alarm pattern(s). One response signal can be assigned to precisely one alarm pattern, or one response signal can also be assigned to a plurality of alarm patterns. Equally, one alarm pattern can result in a plurality of different response signals.

The alarm pattern can, in particular, be geared toward a specific succession of occurring alarm signals. In some instances, individual alarms or an occurrence of a group of alarms will therefore be safety-critical only if the alarms occur in a specific order. This order can be predefined as a relevant alarm pattern.

The examples proposed here may be based, in particular, on at least one of the following solutions. In particular, combinations of the following features could be used to achieve a desired result. The features of the method could be combined with any feature(s) of the apparatus, device or system, or vice versa.

A method for processing alarm signals is proposed, with the following acts: comparing a multiplicity of selected alarm signals with a predefined alarm pattern, wherein the multiplicity of the selected alarm signals is determinable from alarm signals, and transmitting at least one response signal if the selected alarm signals match the predefined alarm pattern.

In one embodiment, the alarm signals are assigned to one or more alarm types and the determination of the multiplicity of the selected alarm signals is based on the alarm types.

In one embodiment, the predefined alarm pattern comprises a temporal succession of selected alarm signals.

In one embodiment, the selected alarm signals are compared with the alarm pattern within a time window.

In one embodiment, the alarm pattern is stored in a memory.

In one embodiment, a multiplicity of alarm patterns are stored in the memory and the alarm pattern is selected from the multiplicity of the stored alarm patterns.

In one embodiment, the transmission of the response signal is based on combined alarm signals which are formed from a group of the selected alarm signals which match the predefined alarm pattern.

In one embodiment, the method also comprises the following acts: comparing the at least one response signal with a response signal time-delayed by a test time, and signaling an alarm recovery if the at least one response signal and the time-delayed response signal do not match.

In one embodiment, the at least one response signal is one from the following group: an interrupt, a non-maskable interrupt (NMI), a CPU reset, an application reset, an emergency stop or a power-on reset (POR).

An apparatus is also proposed for processing alarm signals, comprising an analysis unit which is configured to determine a multiplicity of selected alarm signals from a multiplicity of alarm signals and to compare the selected alarm signals with a predefined alarm pattern. The analysis unit further comprises a response unit which is configured to generate at least one response signal if the selected alarm signals match the predefined alarm pattern.

In one embodiment, the analysis unit is further configured to compare the selected alarm signals within a predefined time window.

In one embodiment, the analysis unit comprises a detection unit for determining selected alarm signals from the multiplicity of alarm signals and comprises a comparison unit, wherein the comparison unit is configured to compare the selected alarm signals with the predefined alarm pattern.

In one embodiment, the apparatus comprises a memory to store the predefined alarm pattern.

In one embodiment, the detection unit is configured to filter the multiplicity of alarm signals and to feed the filtered alarm signals to the comparison unit as selected alarm signals.

In one embodiment, the detection unit for filtering the multiplicity of alarm signals comprises a finite-state machine. This finite-state machine (FSM) can be designed, for example, as programmable and can be controlled by a processing logic.

In one embodiment, the at least one response signal is one from the following group: an interrupt, a non-maskable interrupt (NMI), a CPU reset, an application reset or a power-on reset (POR).

In one embodiment, the apparatus has at least one external interface and the at least one response signal is forwarded to the at least one external interface.

In one embodiment, the apparatus comprises an alarm restoration unit which is configured to compare the at least one response signal with a response signal delayed by a test time, wherein the alarm restoration unit comprises means for signaling an alarm recovery if the at least one response signal and the time-delayed response signal do not match.

In one embodiment, a microprocessor is proposed which is configured to carry out a method as disclosed in FIG. 4.

In one embodiment, a module with a microprocessor is proposed which is configured to carry out the described method.

Although different example embodiments of the disclosure have been disclosed, it is clear to persons skilled in the art that different changes and modifications can be made which will achieve some of the advantages of the disclosure without departing from the basic concept and scope of the disclosure. It will be obvious to persons skilled in the art in general that other components which perform the same functions can be suitably substituted. It should be noted that features explained with reference to one specific figure can be combined with features from other figures, even in cases where this is not expressly indicated. The methods of the disclosure can furthermore be achieved in all-software implementations, using the suitable processor instructions, or in hybrid implementations which use a combination of hardware logic and software logic in order to achieve the same results. Such modifications to the inventive concept are intended to be covered by the attached claims.

The invention claimed is:

1. A method for processing alarm signals, comprising:
   comparing a multiplicity of selected alarm signals with a predefined alarm pattern, wherein the multiplicity of the selected alarm signals are determined from alarm signals,
   transmitting at least one response signal if the selected alarm signals match the predefined alarm pattern,
   comparing the at least one response signal with a response signal time-delayed by a test time, and
   signaling an alarm recovery if the at least one response signal and the time-delayed response signal do not match.

2. The method as claimed in claim 1, wherein the alarm signals are assigned to one or more alarm types and the determination of the multiplicity of the selected alarm signals is based on the alarm types.

3. The method as claimed in claim 1, wherein the predefined alarm pattern comprises a temporal succession of selected alarm signals.

4. The method as claimed in claim 1, wherein the selected alarm signals are compared with the alarm pattern within a time window.

5. The method as claimed in claim 1, wherein the alarm pattern is stored in a memory.

6. The method as claimed in claim 5, wherein a multiplicity of alarm patterns are stored in the memory and the alarm pattern is selected from the multiplicity of the stored alarm patterns.

7. The method as claimed in claim 1, wherein the transmission of the response signal is based on combined alarm signals which are formed from a group of the selected alarm signals which match the predefined alarm pattern.

8. The method as claimed in claim 1, wherein the predefined alarm pattern comprises an ordered list of alarms, and wherein the at least one response signal is transmitted if the selected alarm signals match the ordered list of alarms of the predefined alarm pattern in order.

9. The method as claimed in claim 1, wherein the at least one response signal is one from the following group: an interrupt, a non-maskable interrupt (NMI), a CPU reset, an application reset, an emergency stop or a power-on reset (POR).

10. An apparatus for processing alarm signals, comprising:
- an analysis unit configured to determine a multiplicity of selected alarm signals from a multiplicity of alarm signals, and further configured to compare the selected alarm signals with a predefined alarm pattern,
- a response unit configured to generate at least one response signal if the selected alarm signals match the predefined alarm pattern, and
- an alarm restoration unit configured to compare the at least one response signal with a response signal delayed by a test time,
- wherein the alarm restoration unit comprises a means for signaling an alarm recovery if the at least one response signal and the time-delayed response signal do not match.

11. The apparatus as claimed in claim 10, wherein the analysis unit is further configured to compare the selected alarm signals within a predefined time window.

12. The apparatus as claimed in claim 10, wherein the analysis unit comprises:
- a detection unit configured to determine selected alarm signals from the multiplicity of alarm signals, and
- a comparison unit configured to compare the selected alarm signals with the predefined alarm pattern.

13. The apparatus as claimed in claim 10 further comprising a memory configured to store the predefined alarm pattern.

14. The apparatus as claimed in claim 12, wherein the detection unit is configured to filter the multiplicity of alarm signals, and further configured to feed the filtered alarm signals to the comparison unit as selected alarm signals.

15. The apparatus as claimed in claim 12, wherein the detection unit comprises a finite-state machine configured to filter the multiplicity of alarm signals.

16. The apparatus as claimed in claim 10, wherein the at least one response signal is one from the following group: an interrupt, a non-maskable interrupt (NMI), a CPU reset, an application reset or a power-on reset (POR).

17. The apparatus as claimed in claim 10, wherein the apparatus further comprises at least one external interface, and the at least one response signal is forwarded to the at least one external interface.

18. A microprocessor containing instructions, that upon executing the instructions is configured to carry out a method, comprising:
- comparing a multiplicity of selected alarm signals with a predefined alarm pattern, wherein the multiplicity of the selected alarm signals are determined from alarm signals,
- transmitting at least one response signal if the selected alarm signals match the predefined alarm pattern,
- comparing the at least one response signal with a response signal time-delayed by a test time, and
- signaling an alarm recovery if the at least one response signal and the time-delayed response signal do not match.

19. The microprocessor of claim 18, wherein the microprocessor resides in a module.

* * * * *